United States Patent
Dey et al.

(10) Patent No.: US 10,930,169 B2
(45) Date of Patent: Feb. 23, 2021

(54) COMPUTATIONALLY DERIVED ASSESSMENT IN CHILDHOOD EDUCATION SYSTEMS

(71) Applicant: International Business Machines Corporation, Armonk, NY (US)

(72) Inventors: Prasenjit Dey, Bangalore (IN); Vijay Ekambaram, Tamilnadu (IN); Ravindranath Kokku, Yorktown Heights, NY (US); Nitendra Rajput, Haryana (IN); Ruhi Sharma Mittal, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 407 days.

(21) Appl. No.: 15/587,022

(22) Filed: May 4, 2017

(65) Prior Publication Data

US 2018/0322801 A1 Nov. 8, 2018

(51) Int. Cl.
*G09B 7/02* (2006.01)
*G06F 17/18* (2006.01)
(Continued)

(52) U.S. Cl.
CPC .............. *G09B 7/02* (2013.01); *G06F 17/18* (2013.01); *G09B 5/06* (2013.01); *G09B 5/065* (2013.01); *G09B 5/08* (2013.01)

(58) Field of Classification Search
CPC . G09B 5/06; G09B 5/065; G09B 5/08; G09B 7/02
See application file for complete search history.

(56) References Cited

U.S. PATENT DOCUMENTS

| 5,613,909 A | 3/1997 | Stelovsky |
| 5,978,648 A | 11/1999 | George et al. |

(Continued)

FOREIGN PATENT DOCUMENTS

| CN | 102289958 A | 12/2011 |
| CN | 203055219 U | 7/2013 |

OTHER PUBLICATIONS

International Search Report and Written Opinion from related application PCT/IB2017/057942, dated Apr. 16, 2018; 11 pgs.

(Continued)

*Primary Examiner* — Eddy Saint-Vil
(74) *Attorney, Agent, or Firm* — Intelletek Law Group, PLLC; Gabriel Daniel, Esq.

(57) ABSTRACT

A system for performing implicit assessment of a pupil is provided. The system receives a learning content from a content provider, the learning content having checkpoints at different stages of the learning content. The system associates assessment instructions with each checkpoint of the learning content. The system renders the received learning content for presentation to a pupil and captures the behaviors of the pupil during the presentation of the learning content. The system performs an assessment of the pupil at each checkpoint encountered during the rendering of the learning presentation. The assessment at a checkpoint includes using the checkpoint's associated assessment instructions to assign a score based on the captured behaviors. The system then produces an overall evaluation based on the assessments performed at the encountered checkpoints.

14 Claims, 7 Drawing Sheets

(51) Int. Cl.
*G09B 5/06* (2006.01)
*G09B 5/08* (2006.01)

(56) References Cited

U.S. PATENT DOCUMENTS

| | | | | |
|---|---|---|---|---|
| 2010/0292545 | A1* | 11/2010 | Berka | A61B 5/163 |
| | | | | 600/301 |
| 2011/0256520 | A1* | 10/2011 | Siefert | G09B 5/10 |
| | | | | 434/322 |
| 2011/0263946 | A1* | 10/2011 | el Kaliouby | A61B 5/1128 |
| | | | | 600/300 |
| 2012/0094814 | A1* | 4/2012 | Atkins | G09B 19/0038 |
| | | | | 482/142 |
| 2012/0208168 | A1* | 8/2012 | Atkinson | G06Q 10/06398 |
| | | | | 434/362 |
| 2012/0237920 | A1 | 9/2012 | Ho | |
| 2013/0004930 | A1* | 1/2013 | Sorenson | G09B 7/02 |
| | | | | 434/350 |
| 2013/0295545 | A1* | 11/2013 | Dawley | G09B 7/02 |
| | | | | 434/350 |
| 2014/0063461 | A1 | 3/2014 | Yao | |
| 2014/0212854 | A1* | 7/2014 | Divakaran | G09B 19/00 |
| | | | | 434/236 |
| 2015/0044657 | A1 | 2/2015 | Dalal et al. | |
| 2015/0079565 | A1 | 3/2015 | Miller et al. | |
| 2016/0203726 | A1* | 7/2016 | Hibbs | G09B 7/02 |
| | | | | 434/308 |
| 2017/0169715 | A1* | 6/2017 | Alyuz Civitci | G09B 5/06 |
| 2017/0278417 | A1* | 9/2017 | Ur | G09B 7/06 |
| 2018/0018540 | A1* | 1/2018 | Hazur | G09B 5/02 |

OTHER PUBLICATIONS

Gamify Your Video in Minutes! [online]. parWinr Inc., 2011-2014 [retrieved on May 4, 2017]. Retrieved from the Internet: <URL: http://www.parwinr.com/company_pages>, 3 pages.

* cited by examiner

COMPUTATIONALLY DERIVED ASSESSMENT IN CHILDHOOD EDUCATION SYSTEMS

BACKGROUND

Technical Field

The present disclosure generally relates to systems and methods for controlling the presentation of learning materials to a pupil.

Description of the Related Art

Formal assessment (exams, quizzes, multiple choice questions, etc.) assesses a student's understanding of learning content by posing formal questions to the student. Many believe formal assessment models to be inadequate for assessing children's understanding in their learning process because formal questions often lead to cognitive overload and stress and can lead to inaccurate evaluation. On the other hand, implicit assessment assesses a student's understanding of the learning content without posing any explicit questions. Implicit assessment relies on observation and analysis of user behaviors as primary data source for effective evaluation.

SUMMARY

Some embodiments of the disclosure provide a system for performing implicit assessment. Specifically, the system receives a learning content from a content provider, the learning content having checkpoints at different stages of the learning content. The system associates assessment instructions with each checkpoint of the learning content. The system renders the received learning content for presentation to a pupil and captures the behaviors of the pupil during the presentation of the learning content. The system performs an assessment of the pupil at each checkpoint encountered during the rendering of the learning presentation. The assessment at a checkpoint includes using the checkpoint's associated assessment instructions to assign a score based on the captured behaviors. The system then produces an overall evaluation based on the assessments performed at the encountered checkpoints.

Some embodiments of the disclosure provide a method for creating the assessment instructions and identifying the checkpoints in the learning content. The method presents the learning content to multiple pupils. The method captures behaviors of each pupil during the presentation of the learning content. The method also receives a set of teacher evaluations, each teacher evaluation linking a captured behavior of pupils with an assessment score at a stage of the learning content. The method then uses the captured pupil behaviors and the received teacher evaluations as training sets to identify a set of checkpoints in the learning content and to derive a set of assessment rules for assessing a pupil.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Formal assessment (exams, quizzes, multiple choice questions, etc.) assesses a student's understanding of learning content by posing formal questions to the student. Many believe formal assessment models to be inadequate for assessing children's understanding in their learning process because formal questions often lead to cognitive overload and stress, and can lead to inaccurate evaluation. On the other hand, implicit assessment assesses a student's understanding of the learning content without posing any explicit questions. Implicit assessment relies on observation and analysis of user behaviors as a primary data source for effective evaluation.

The following provides an example of implicit assessment. A particular learning content is presented to a child. The child watches the particular learning content and interacts with the learning content through touch and/or voice. An implicit assessment system observes the child's behaviors during the presentation of the learning content and evaluates the child's understanding by analyzing the observed behavior, such as whether and when the child smiles, whether and when the child touches the display screen, and when and in which direction the child gazes, etc.

Some embodiments of the disclosure provide a framework for performing implicit assessment. The framework decouples the learning content from assessment logic by associating checkpoints in the learning content with assessment instructions that evaluate observed user behaviors at the checkpoints. Specifically, the framework receives a learning content from a content provider, the learning content having checkpoints at different stages (or different timeslots, portions, or parts) of the learning content. The framework associates assessment instructions (or checkpoint rules) with each checkpoint of the learning content. The framework renders the received learning content for presentation to a pupil and captures the behaviors of the pupil during the presentation of the learning content. The system performs an assessment of the pupil at each checkpoint encountered during the rendering of the learning presentation. When a portion of the learning content having a checkpoint is rendered, the framework evaluates the captured user behaviors according to the checkpoint's associated assessment instructions. The assessment at a checkpoint includes using the checkpoint's associated assessment instructions to assign a score based on the captured behaviors. The system then produces an overall evaluation based on the assessments performed at the encountered checkpoints.

Figure 1:
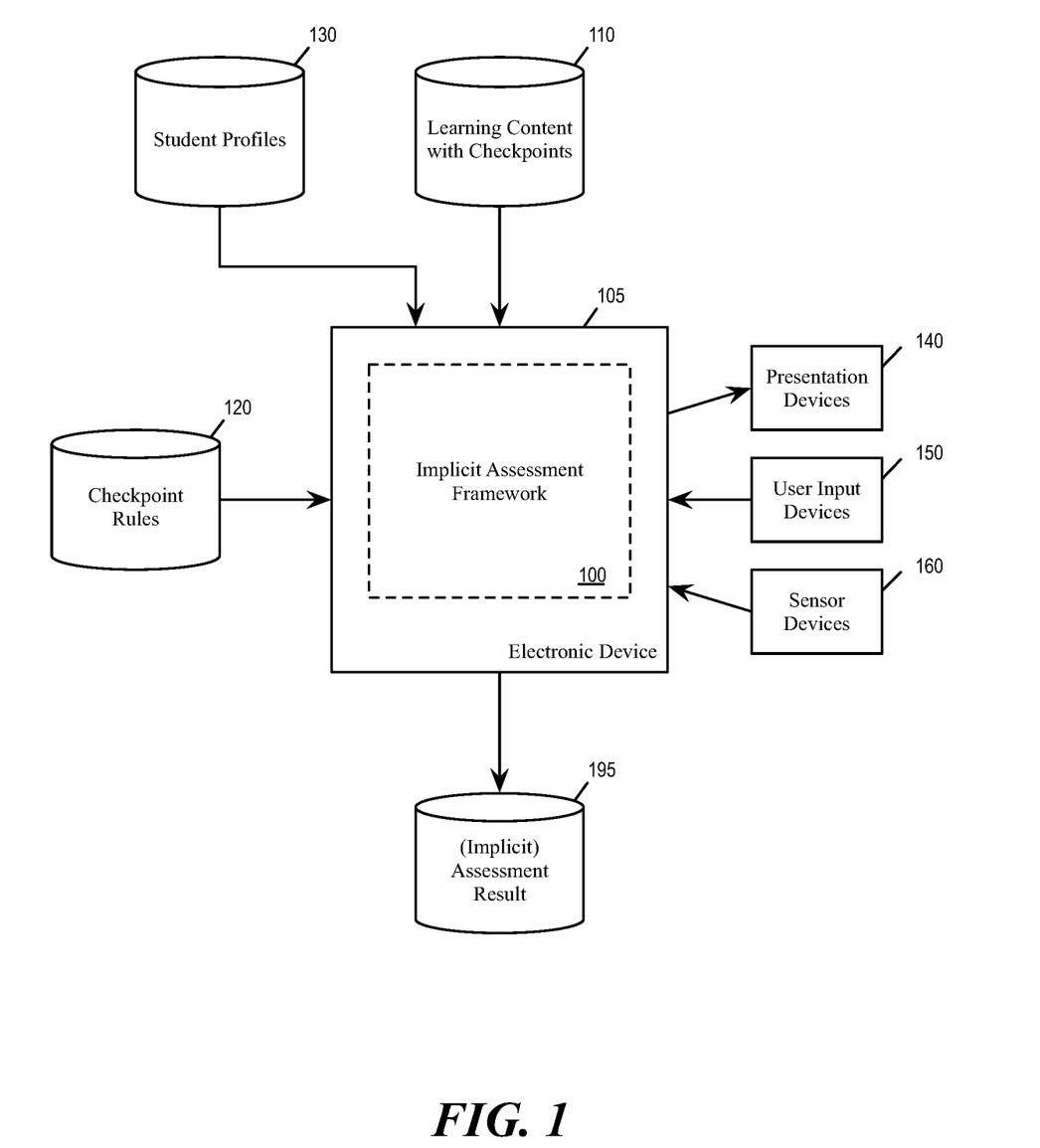
FIG. 1 illustrates a computing device that implements an implicit assessment framework.

FIG. 1 illustrates a computing device 105 that implements an implicit assessment framework 100 (also known as framework for derived assessment, or FDA). The framework receives learning content with checkpoints and associates assessment instructions with the checkpoints of the learning content. The framework renders the learning content for presentation, captures pupil behaviors during the presentation, and executes assessment instructions at the checkpoints to perform assessments of the pupil based on the captured behaviors.

As illustrated, the framework 100 receives learning content 110, checkpoint rules 120, and student profiles 130. The framework also generates assessment or evaluation result 195. The computing device 105 implementing the framework is equipped with presentation devices 140, user input devices 150, and sensor devices 160. Though not illustrated, the computing device 105 is also equipped with communications devices for receiving and delivering data, such storage device interfaces and network interfaces.

The presentation devices 140 are for presenting the learning content to the pupil. The presentation devices 140 may include a video output device, an audio output device, and/or other types of sensory presentation devices. The user input devices 150 are for receiving user inputs, such as a keyboard for receiving keystrokes, a button for receiving selections (clicks), a touchscreen for receiving touch gestures, or other types of user input devices for receiving other types of user input. The sensor devices 160 are for receiving, perceiving, or observing user behaviors during the presentation of the learning content, such as a camera for capturing facial expressions, eye-gazes, hand gestures, a microphone for capturing sounds, a touchscreen for capturing touch gestures, etc.

The learning content 110 is the material that will be presented to the pupil. The learning content can be in many different possible forms, including video, audio, electronic books, interactive games, or other types of multimedia presentations. The learning content is generally provided by a content provider (e.g., a publisher or software developer) and not generated by the framework 100. In some embodiments, the learning content is delivered to the framework 100 in the form of a learning content rendering application, i.e., a software program that, when executed at one or more processing unit (e.g., a processor), renders the learning content for presentation to the pupil. In some embodiments, the framework 100 includes an application for rendering the learning content.

The checkpoint rules 120 stores rules for implicitly evaluating the pupil based on the pupil's interaction with the framework and the pupil's behaviors during the presentation of the learning content. The learning content 110 is populated with checkpoints that are installed by the content provider. Each checkpoint is associated with a particular part (e.g., a stage, a state, a time slot, or a transition) in the presentation of the learning content. In some embodiments, each the checkpoint is embedded in the corresponding part of the learning content data. When a part of the learning content having a checkpoint is rendered and presented, (i.e., when the checkpoint is encountered), the framework 100 performs a set of actions based on rules or instructions that are associated with the checkpoint. In other words, the framework configures each checkpoint with a set of checkpoint rules that are to be executed when the corresponding part of the learning content is rendered.

The student profile 130 stores characteristics about the pupil user. In some embodiments, the framework 100 factors in the pupil's characteristics in his profile when using the checkpoint rules 120 to evaluate the pupil's level of understanding of the learning content.

Figure 2A:
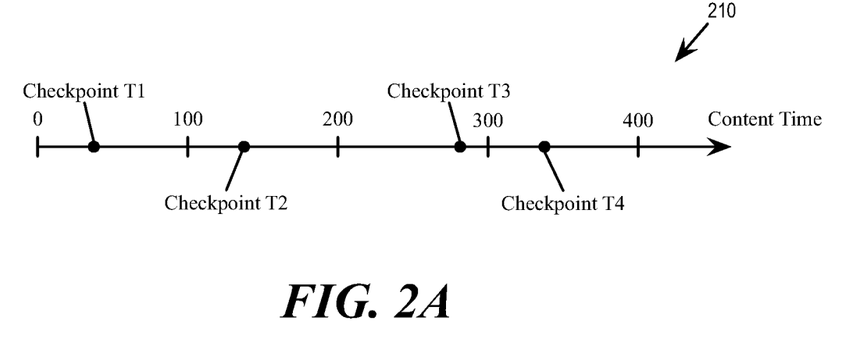
FIGS. 2A-B conceptually illustrates the relationship between checkpoints and learning content.
Figure 2B:
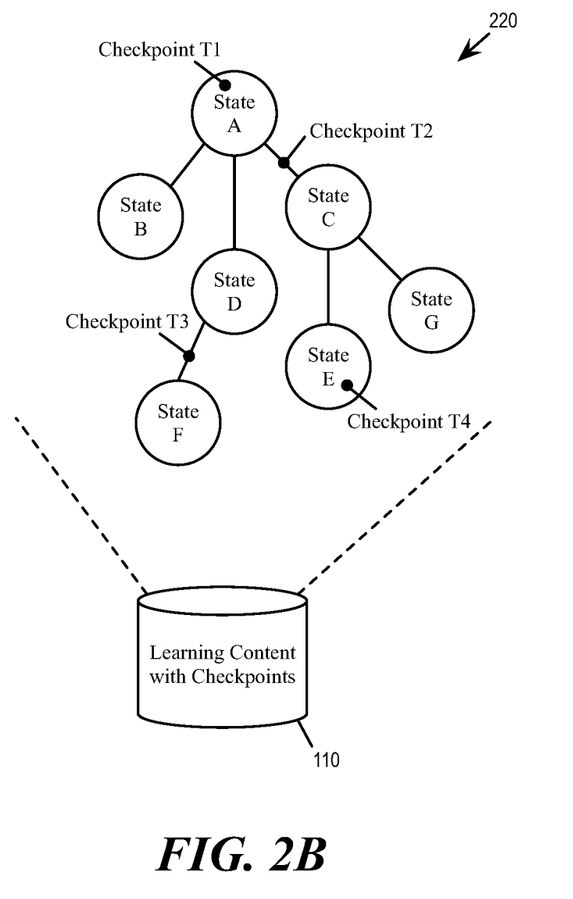

FIGS. 2A-B conceptually illustrates the relationship between checkpoints and learning content. FIG. 2A illustrates an example timeline 210 of the learning content 110. According to the timeline 210, the learning content rendering application (or the framework 100) encounters checkpoints T1, T2, T3, and T4 during the presentation of the learning content. The presentation of the learning content may be linear (such as a movie) such that each of the checkpoints T1-T4 is associated with a specific time slot of the learning content. According to the example timeline 210, the checkpoint T1 is associated with time 40, the checkpoint T2 is associated with time 140, the checkpoint T3 is associated with time 280, and checkpoint T4 with time 335. The rendering application encounters a checkpoint when it renders the time slot in the learning content associated with the checkpoint. For example, the rendering application encounters the checkpoint T1 when it is rendering the learning content at playback time 40.

The presentation of the learning content 110 may be interactive, and may traverse through different sequences of states or scenarios based on user inputs. The checkpoints for this type of learning content may be associated with states or state transitions rather than a specific playback time. FIG. 2B illustrates a simplified state diagram 220 of the learning content. According to the state diagram, the learning content transitions between states A, B, C, D, E, F, and G. The checkpoint T1 is associated with state A, the checkpoint T2 is associated with a transition from state A to state C, the checkpoint T3 is associated with a transition between state D and F, and the checkpoint T4 is associated with the state E. The rendering application encounters a checkpoint when it renders the state or the state transition in the learning content associated with the checkpoint. For example, the rendering application encounters checkpoint T1 when rendering state A of the learning content, encounters checkpoint T2 when rendering transition from state A to C, etc., regardless of the actual playback time.

Returning to FIG. 1. The checkpoint rules 120 provide the rules or instructions that are associated with the checkpoints of the learning content 110. In some embodiments, the framework 100 maintains checkpoint rules and/or instructions are maintained separately from the learning content, and the framework executes checkpoint rules and/or instructions as the corresponding checkpoints are encountered during the rendering of the corresponding learning content stage. In some embodiments, some of the checkpoint rules and/or instructions are injected as code snippets into the learning content at the corresponding checkpoints, and the injected code snippets are executed by the learning content rendering application as being part of the learning content.

Figure 3:
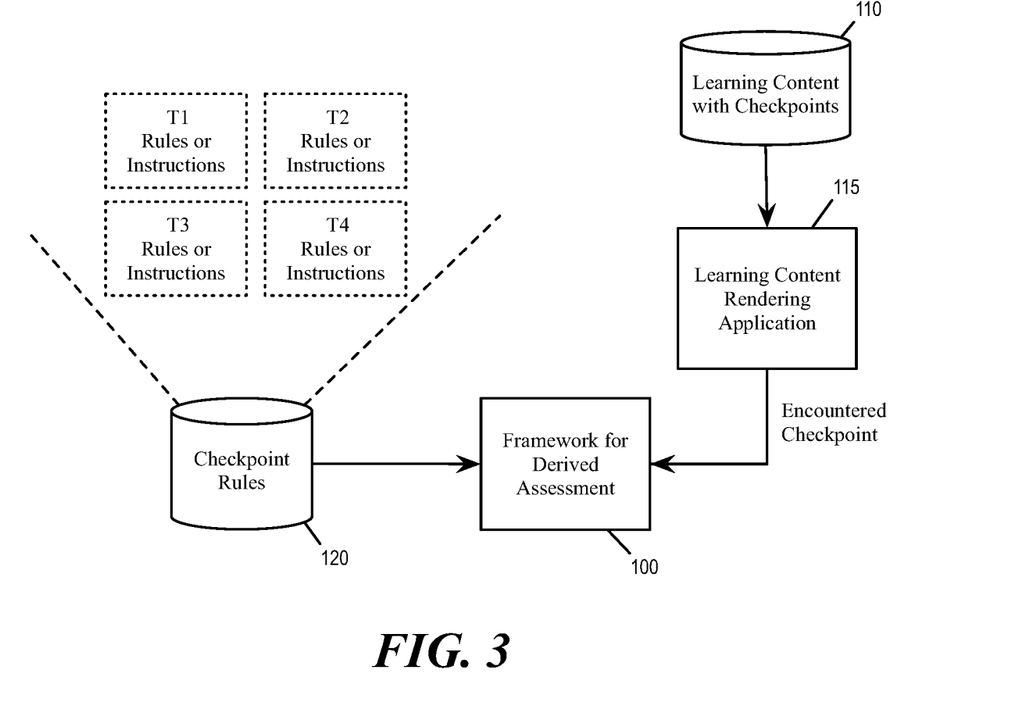
FIG. 3 conceptually illustrates an implicit assessment framework that executes instructions or rules that are maintained separately from the learning content.

FIG. 3 conceptually illustrates an implicit assessment framework that executes instructions or rules that are maintained separately from the learning content. As illustrated, the framework 100 is running a learning content rendering application 115 that renders the learning content 110 for presentation. The learning content being rendered has checkpoints installed within, and the rendering application reports checkpoints being encountered to the framework 100. The framework 100 in turn fetches the instructions associated with the encountered checkpoint for execution from the checkpoint rules storage 120.

Figure 4:
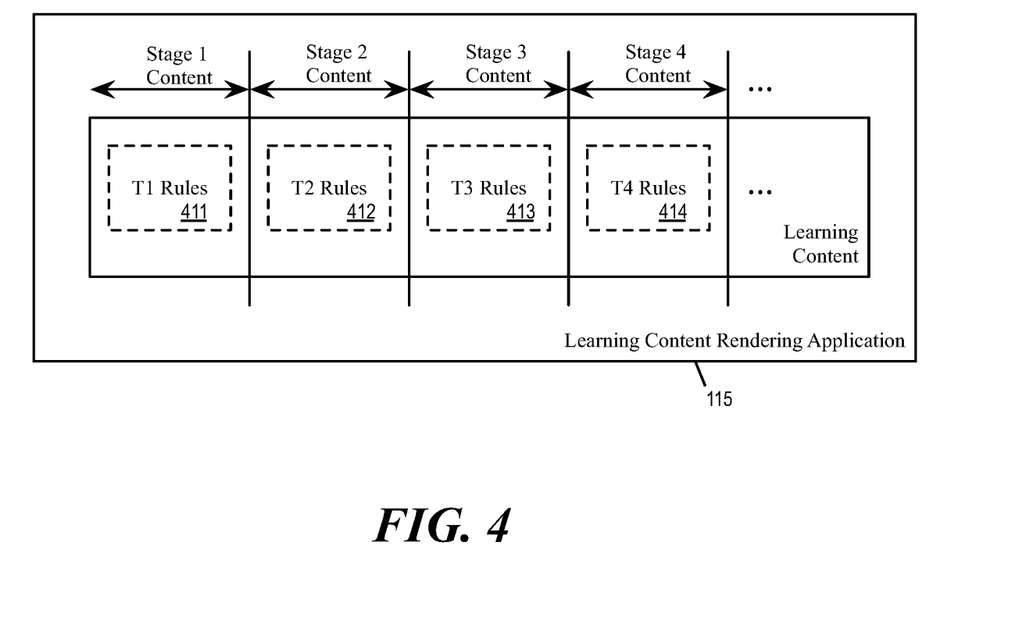
FIG. 4 conceptually illustrates a learning content with checkpoint instructions or rules inserted as code snippets.

FIG. 4 conceptually illustrates a learning content with checkpoint instructions or rules inserted as code snippets. As illustrated, the learning content 110 includes at least stages 1 through 4 (each stage may correspond to a time slot, a playback time, or a state of the learning content). Stage 1 of the learning content 110 has checkpoint T1 and includes an inserted code snippet 411 for checkpoint T1. Stage 2 of the learning content 110 has checkpoint T2 and includes an inserted code snippet 412 for checkpoint T2. Stage 3 of the learning content 110 has checkpoint T3 and includes an inserted code snippet 413 for checkpoint T3. So on and so forth. Thus, for example, when the learning content rendering application 115 renders stage 2 of the learning content, it also executes the instructions of checkpoint T2 installed in the code snippet 412. (Though not illustrated, some stages of the learning content may not have checkpoints so would not have inserted code snippets.)

A checkpoint rule associated with a checkpoint relates pupil behavioral interactions with the learning content rendered at that checkpoint. Specifically, a checkpoint rule maps pupil behavioral interaction (e.g., facial expressions, hand gestures, touch interactions, eye-gaze, voices, and affect parameters) that are observed through the sensor devices 160 or through the user input devices 150 to various level of understanding (e.g., mastered, average, or poor). Some examples of checkpoint rules include:

If the pupil has mastered the content, the pupil would click response button in less than 5 seconds.

If the pupil has understood the content, the pupil would smile at time T2.

If the pupil does not understand the content, the pupil would not respond or respond after a long delay.

In some embodiments, at least some of the checkpoint rules are written in declarative language (declarative language based rule-representation). A program written in declarative language describes its desired results without explicitly listing commands or steps that are to be performed. In some embodiments, the framework interprets the checkpoint rules written in declarative language into instructions that perform assessment of a pupil by analyzing the pupil's behaviors and interactions. The example checkpoints rules listed above are written in declarative language. In some embodiments, the framework 100 provides an interpreter or a compiler to translate the checkpoint rules written in declarative language into actual computational operations to be performed by the physical hardware of the computing device 105.

As mentioned, checkpoint rules include instructions that are executed while the learning content is rendered. In some embodiments, pupil behaviors (from the user input device 150 and the sensor devices 160) are continuously captured as metadata and stored in an instrumentation library, while the checkpoint rules are executed to produce assessment results whenever the corresponding checkpoints are encountered. Since not all pupil interactions and behaviors are available at all time, the checkpoint rules are defined as combinations of all possible interactions and captured behaviors that were captured earlier and stored in an instrumentation library. The framework opportunistically executes the rules at checkpoints to derive scores based on the available data stored in the library. In other words, at each checkpoint, the framework performs assessment operations based on the observations of the pupil (i.e., the captured behaviors and user interactions) that have been made up to the time when the checkpoint is encountered.

For example, when interpreting the rule "If the pupil has understood the content, he would smile at time T2," the framework would assess whether the pupil understood the learning content by examining the instrumentation library for captured facial expression that indicate a smile by the pupil at time T2. Likewise, when interpreting the rule "If the pupil has mastered the content, he would click the response button in less than 5 seconds," the framework would assess whether the pupil understood the learning content by examining the instrumentation library for a record of a button click within 5 seconds of the presentation of the response button.

Figure 5:
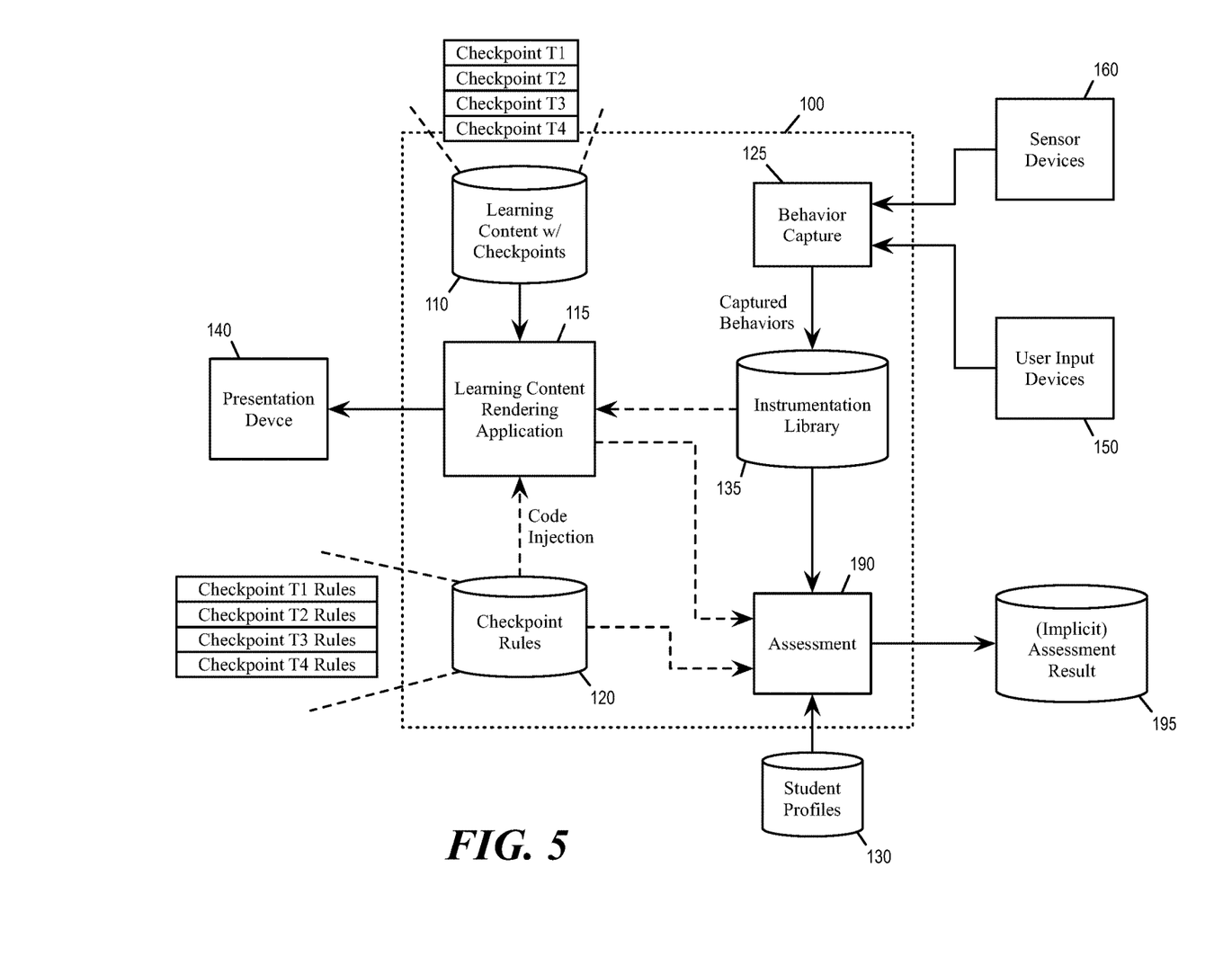
FIG. 5 illustrates dataflow in a framework for implicit assessment.

FIG. 5 illustrates dataflow in a framework for implicit assessment. Specifically, the figure shows dataflow in the framework 100 for capturing pupil's behaviors and assessing the pupil's understanding based on the captured behaviors. As illustrated, the framework 100 includes learning content 110, the learning content rendering application 115, the checkpoint rules 120, a behavior capture module 125, the instrumentation library 135, and an assessment module 190. In some embodiments, the modules 110, 115, 120, 125, 135, and 190 are modules of hardware circuits implemented by one or more integrated circuits (ICs) of an electronic apparatus (e.g., the computing device 105). Though the modules 110, 115, 120, 125, 135, and 190 are illustrated as being separate modules, some of the modules can be combined into a single module. For example, the functionalities of the instrumentation library 135 can be merged into the assessment module 190.

As illustrated, the framework 100 is operating the learning content rendering application 115. The rendering application 115 renders learning content 110 and presents the rendered content to the pupil through the presentation devices 140. The behavior capture module 125 captures the pupil's interaction with the learning content as well as the pupil's behaviors through the user input devices 150 and the sensor devices 160. The metadata of the captured behaviors are stored in the instrumentation library 135. In some embodiments, the behavior capture module 125 characterizes the input captured by the sensor devices 160 and the user input devices 150 as specific behaviors (e.g., by performing image recognition, voice recognition, and/or pattern recognition on video, audio, and/or other user input). The characterized behaviors are in turn stored in the instrumentation library 135 as metadata. In some embodiments, the instrumentation library also stores metadata for indicating the stage or the playback time of the learning content being rendered.

The assessment module 190 performs assessment of the pupil based on input from the rendering application 115 and/or the metadata stored in the instrumentation library. The assessment performed by the assessment module 190 is further based on pupil's profile stored in 130. The learning content may have injected code snippets (derived from the checkpoint rules 120) for assessing the pupils at checkpoints T1, T2, T3, and T4. In these instances, the rendering application 115 executes the code snippets as it encounters checkpoints T1-T4. The executed code snippets cause the rendering application 115 to perform an assessment based on the metadata stored in the instrumentation library 135. The results of the assessments are forwarded to the assessment module 190. Alternatively, the assessment module 190 retrieves the captured behavior metadata from the instrumentation library 135 and performs assessments based on the checkpoint rules of the checkpoints T1-T4.

The implicit assessment framework 100 generates (at the assessment module 190) assessment score of captured behaviors at each checkpoint by reading the metadata stored in the instrumentation library 135 based on the rules associated with each checkpoint. In some embodiments, the checkpoint rules of each encountered checkpoint classify the captured behaviors into numerical assessment scores. The framework 100 then aggregates the assessment scores from each checkpoint to derive a final assessment score. Specifically, the framework calculates the overall evaluation score as the weighted arithmetic mean of scores from each checkpoint.

In some embodiments, the score of each checkpoint is weighted according to a priority weight and a confidence weight. The priority weight of a checkpoint is the weight assigned to the observation made at that checkpoint in comparison to observations made at other checkpoints. In other words, the assessment score based on the observation made at a first checkpoint can be weighted more heavily than the assessment score based on the observations made at a second checkpoint for the final aggregated assessment. The confidence weight of an observation is based on the ability of the system (e.g., the computing device 105 implementing the framework 100) to capture the observation at the time when the checkpoint is encountered. In other words, the confidence weight signifies how confident the system is in characterizing or recognizing a pupil's behavior. For example, the captured pupil behaviors may include recognized facial expressions, where each recognized facial expression is assigned a confidence weight. The confidence weight numerically expresses the level of confidence that the system has when the system classifies or recognizes the pupil's facial expression as being smiling, neutral, frustrated, etc. For some embodiments, the value of the confidence weight is a probability value that lies between 0 and 1.

The final assessment score (or the overall evaluation score) is computed according to:

$$OverallScore = \Sigma_i Pri_i * Score_i * Conf_i / \Sigma_i Weight_i \quad \text{(Eq. 1)}$$

Where 'i' is the index of each checkpoint (e.g., T1, T2, etc.);
$Pri_i$ is the priority weight of the observation at checkpoint 'i';
$Conf_i$ is the confidence weight of the observation at checkpoint 'i'; and
$Score_i$ is the assessment score calculated at checkpoint 'i' based on the checkpoint's rules.

In some embodiments, the framework 100 also produces an overall confidence score according to:

$$\Sigma_i Pri_i * Conf_i / \Sigma_i Pri_i \quad \text{(Eq. 2)}$$

The framework 100 then compares the overall evaluation score of the pupil with defined thresholds to determine the level of understanding of the pupil. For example, in some embodiments, if the overall evaluation score of the pupil is less than a first threshold (e.g., less than 0.4), the framework would indicate that the pupil does not understand the learning content. If the overall evaluation score of the pupil is greater than the first threshold but less than a second threshold (e.g., greater than 0.4 but less than 0.8), the framework would indicate that the pupil has average understanding of the learning content. If the overall evaluation score of the pupil is greater than the second threshold (e.g., greater than 0.8), the framework would indicate that the pupil has mastered the learning content.

Tables 1-3 below illustrate examples of implicit assessments for three different pupils 'A', 'B', and 'C'. The assessments are based on observations (i.e., captured behaviors and user interactions) made at checkpoints at time slots T1 and T2 using the rules that are associated with those checkpoints. The tables show the computation of scores at each checkpoint as well as the computation of a final overall evaluation score.

Table 1 shows the implicit assessment of a pupil 'A':

|  | Checkpoint Rule | Priority weight | Captured Behavior | Confid. Score | Checkpoint Score |
|---|---|---|---|---|---|
| Checkpoint T1 | Smile: 1.0<br>Neutral face: 0.5 | 1 | Laughed | 0.5 | 1.0 |
| Checkpoint T2 | Respond in <5 sec: 1.0<br>Respond in <10 sec: 0.5<br>Respond in >10 sec: 0.2<br>No Response: 0.0 | 2 | Respond in 1 sec | 1.0 | 1.0 |

-continued

| Checkpoint Rule | Priority weight | Captured Behavior | Confid. Score | Checkpoint Score |
|---|---|---|---|---|
| Overall Evaluation | | | | |
| Overall Evaluation (Eq. 1) | $x = (1 * 0.5 * 1 + 2 * 1 * 1)/(1 + 2) = 0.834$ | | | |
| Overall Confidence (Eq. 2) | $x = (1 * 0.5 + 2 * 1)/(1 + 2) = 0.84$ | | | |
| Level of understand. | $x \leq 0.4$: no understanding<br>$0.4 < x \leq 0.8$: average<br>$0.8 < x \leq 1.0$: mastered | | Mastered Content | |

Table 2 shows the implicit assessment of a pupil 'B'

| | Checkpoint Rule | Weight (Priority weight) | Captured Behavior | Confidence weight | Checkpoint Score |
|---|---|---|---|---|---|
| Checkpoint T1 | Smile: 1.0<br>Neutral face: 0.5 | 1 | Neutral | 0.9 | 0.5 |
| Checkpoint T2 | Respond in <5 sec: 1.0<br>Respond in <10 sec: 0.5<br>Respond in >10 sec: 0.2<br>No response: 0.0 | 2 | Respond in 8 sec | 1.0 | 0.5 |
| Overall Evaluation | | | | | |
| Overall Evaluation (Eq. 1) | $x = (1 * 0.9 * 0.5 + 2 * 1 * 0.5)/(1 + 2) = 0.483$ | | | | |
| Overall Confidence (Eq. 2) | $x = (1 * 0.9 + 2 * 1)/(1 + 2) = 0.97$ | | | | |
| Level of understand. | $x \leq 0.4$: no understanding<br>$0.4 < x \leq 0.8$: average<br>$0.8 < x \leq 1.0$: mastered | | Average Understanding | | |

Table 3 shows the implicit assessment of a pupil 'C'

| | Checkpoint Rule | Weight (Priority weight) | Captured Behavior | Confidence weight | Checkpoint Score |
|---|---|---|---|---|---|
| Checkpoint T1 | Smile: 1.0<br>Neutral face: 0.5 | 1 | Smiled | 0.8 | 1.0 |
| Checkpoint T2 | Respond in <5 sec: 1.0<br>Respond in <10 sec: 0.5<br>Respond in >10 sec: 0.2<br>No response: 0.0 | 2 | No response | 1.0 | 0.0 |
| Overall Evaluation | | | | | |
| Overall Evaluation (Eq. 1) | $x = (1 * 0.8 * 1 + 2 * 1 * 0)/(1 + 2) = 0.267$ | | | | |
| Overall Confidence (Eq. 2) | $x = (1 * 0.8 + 2 * 1)/(2 + 1) = 0.94$ | | | | |
| Level of understand. | $x \leq 0.4$: no understanding<br>$0.4 < x \leq 0.8$: average<br>$0.8 < x \leq 1.0$: mastered | | Does not understand the learning content | | |

In some embodiments, the threshold values used in the rules are normalized with respect to the pupil's characteristics (as provided by the student profiles 130.) This is because different pupils have different response characteristics to stimulus. For example, two different pupils may equally appreciate a same scenario to be funny, yet one pupil laughs heartily while the other barely cracked a smile. In the example of pupil 'C' in Table 3, the implicit assessment framework may have observed that the pupil's threshold to laughter is very high. To normalize this, the framework changes the checkpoint rule for pupil 'C' such that a smile is awarded 1.0 point. With this normalization, pupil 'C' receives the same score for smiling as pupil 'A' does for laughing at checkpoint T1.

In some embodiments, the checkpoints rules and their associated weights are learned from a training process. In some embodiments, when the content provider develops a learning content, the learning content is tested on pupils with various user profiles. Complete user behavioral interaction with respect to the learning content is captured at an in-lab setting. Manual assessment from educators is recorded along with pupil's behaviors. These data (above two model features) are used to learn, in an unsupervised manner, various rules that corresponds user behaviors with understanding levels. In some embodiments, the weight (i.e., the priority weight) of a checkpoint is also configured or learned by using a training process based on collected user behaviors and corresponding educator evaluations. In addition to learning through training process, the content provider or an educator can create checkpoint rules and their associated weights through heuristics.

The content provider may conduct the data collection (e.g., by recording pupil behaviors and corresponding educator evaluation) to create a training set and use the training set to derive the rules and weights of each checkpoint. An educator user may also create own checkpoint rules to be associated with the checkpoints.

Figure 6:
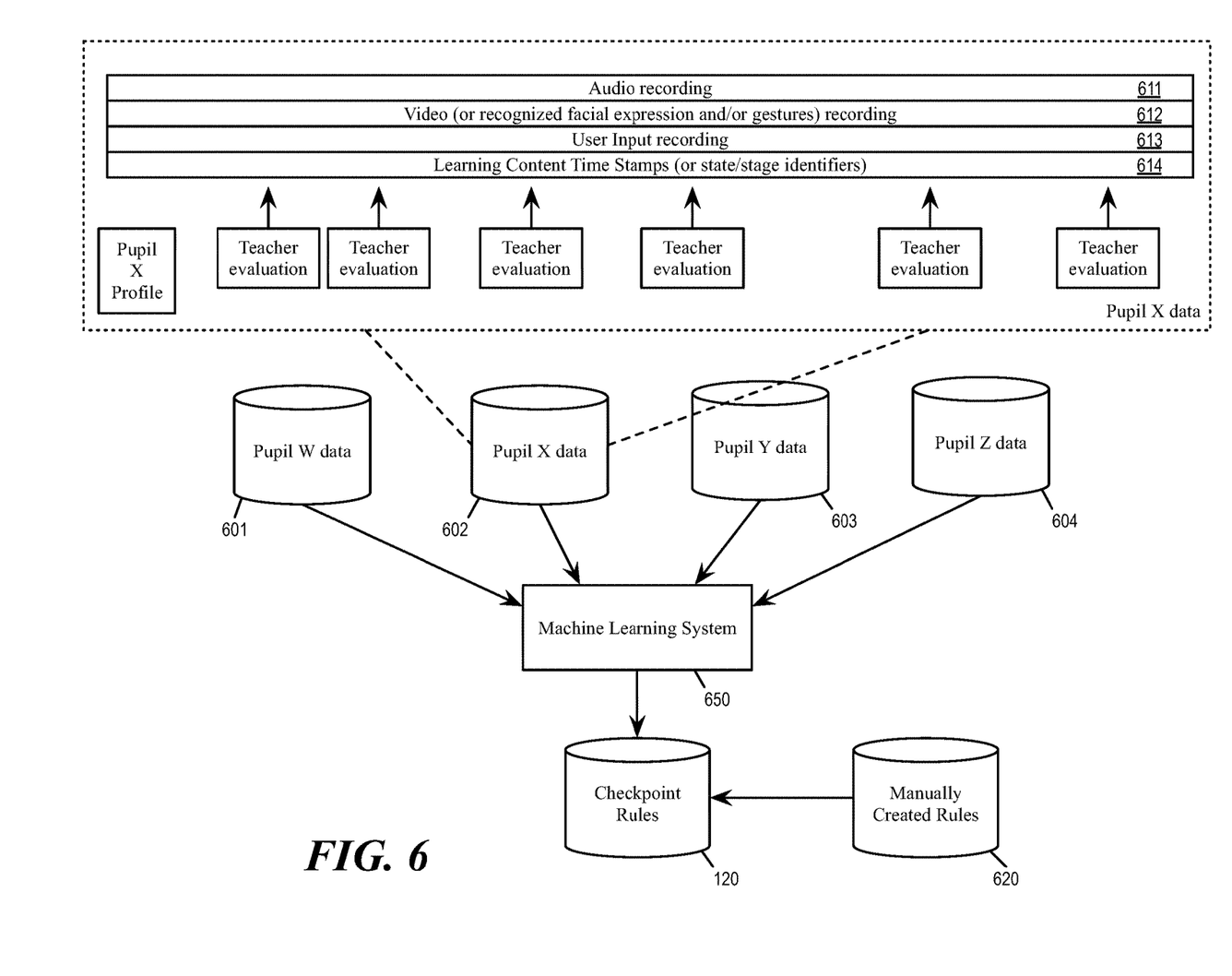
FIG. 6 conceptually illustrates the creation of checkpoint rules.

FIG. 6 conceptually illustrates the creation of checkpoint rules. In the example, the content provider for the learning content conducts test presentations on several pupils, including pupils W, X, Y, and Z. The behaviors, responses, and interactions of the pupils during the test presentation are captured along with corresponding educator evaluations as collected data 601-604 respectively for pupils W, X, Y, and Z.

As illustrated, a set of collected data for a pupil (e.g., collected data 602 for pupil X) may include: an audio recording 611 of the pupil during the test presentation of the learning content; a video recording 612 of the pupil during the test presentation of the learning content; and a log 613 of user input during the test presentation. In some embodiments, the video and/or the audio recording may be replaced or augmented by records of facial expressions, hand gestures, voices, eye-gazes, and/or other characterized behaviors recognized from the video recording and/or the audio recording.

The recordings and logs are accompanied by time stamps 614 or other indications of time or state with respect to the learning content so every action or behavior recognized has a temporal reference. The collected data for the pupil is also associated with (or includes) several teacher evaluations. Each teacher evaluation is a statement that links an observed behavior (facial expression, hand gestures, voice, eye-gazes, touches, responsive clicking, etc.) at a stage or a time slot of the learning content to an assessment score and/or an assessed level of understanding, and/or a weight (priority weight or confidence weight). In some embodiments, the collected data for a pupil also includes a profile of the pupil.

The collected data of the various pupils (including collected data 601-604 for pupils W, X, Y, and Z, respectively) are submitted to a machine learning system 650, which has one or more processing units (e.g., a processor) for using the collected data as training sets to determine checkpoints in the learning content as well as to synthesize assessment rules for each checkpoint. These rules are provided as checkpoint rules 120 to the framework for derived assessment 100. The administrator or the framework 100 may make further edits and additions to the checkpoint rules 120 (illustrated as "manually created rules" 620).

Figure 7:
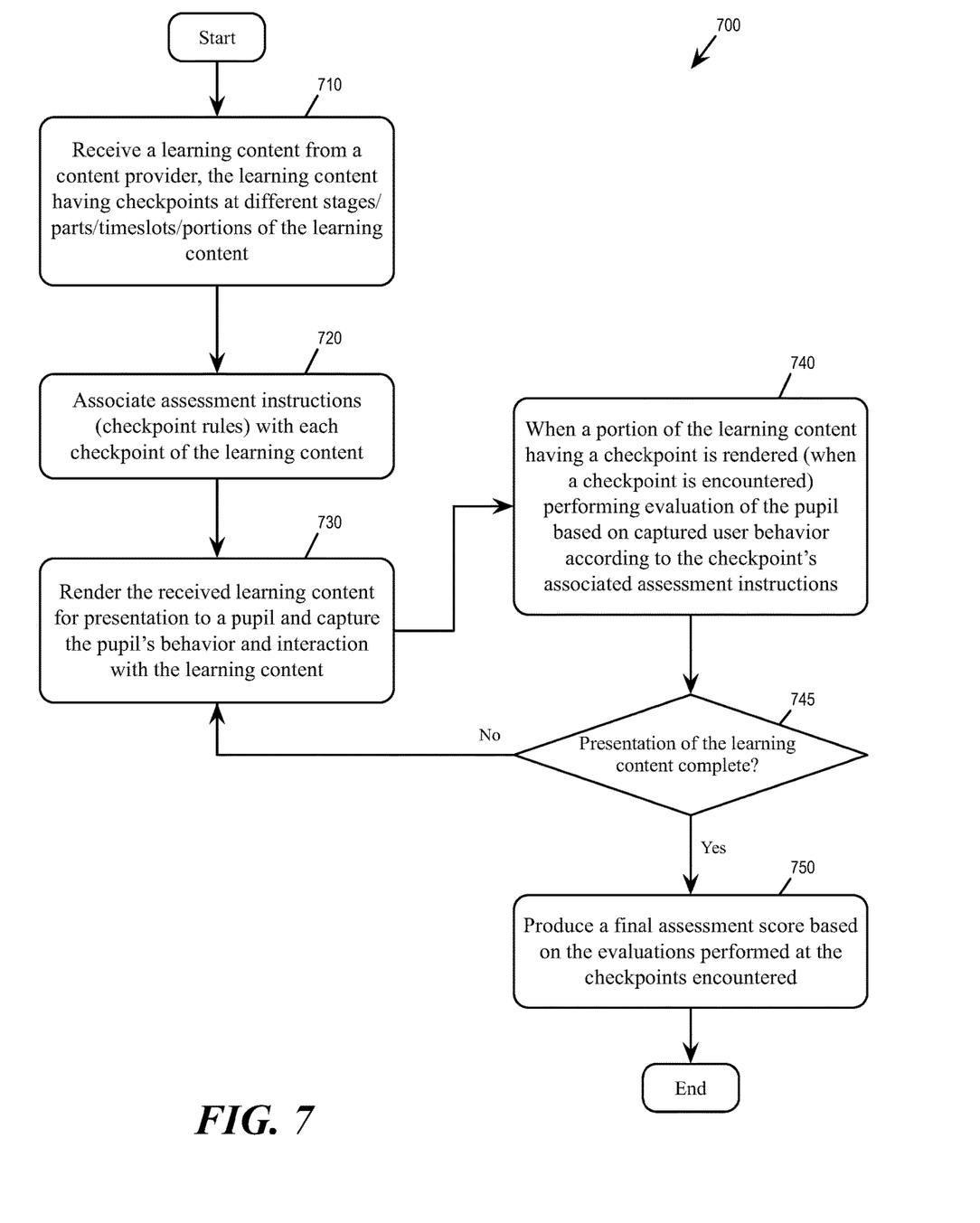
FIG. 7 conceptually illustrates a process for performing implicit assessment of a pupil based on observations of the pupil during the presentation of a learning content.

FIG. 7 conceptually illustrates a process 700 for performing implicit assessment of a pupil based on observations of the pupil during the presentation of a learning content. Specifically, the learning content has checkpoints that are associated with rules or instructions for assessing the pupil based on captured behaviors of the pupil. In some embodiments, one or more processing units (e.g., processor) of a computing device implementing the framework for derived assessment 100 (e.g., the computing device 105) perform the process 700.

The process 700 starts when the framework receives (at 710) a learning content from a content provider, the learning content having checkpoints at different stages (or parts, timeslots, portions) of the learning content. The framework then associates (at 720) assessment instructions (i.e., checkpoint rules) with each checkpoint of the received learning content.

The framework renders (at 730) the received learning content for presentation to a pupil and captures the pupil's behaviors and interactions with the learning content. In some embodiments, metadata of the captured behaviors and interactions is stored in the instrumentation library. When a portion of the learning content having a checkpoint is rendered (i.e., when the learning content rendering application encounters a checkpoint), the framework performs assessment of the pupil based on the captured user behaviors according to the checkpoint's associated assessment instructions. In some embodiments, the assessment at the checkpoint produces a checkpoint score. Tables 1, 2, and 3 above provide examples of computing checkpoint scores.

The framework determines (at 745) whether the presentation of the learning content is complete. If the presentation of the learning content has completed, the process proceeds to 750. Otherwise the process returns to 730 to further render and present the learning content.

At 750, the framework produces a final assessment score by aggregating the checkpoint scores from the evaluations performed at the encountered checkpoints based on the checkpoints' associated rules. In some embodiments, the final assessment score classifies the pupil's level of understanding. The process 700 then ends. Equations 1 and 2, as well as tables 1, 2, and 3, describe how to arrive at the final overall assessment score by aggregating checkpoint scores.

Example Electronic System

The present application may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures (e.g., FIG. 7) illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function (s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
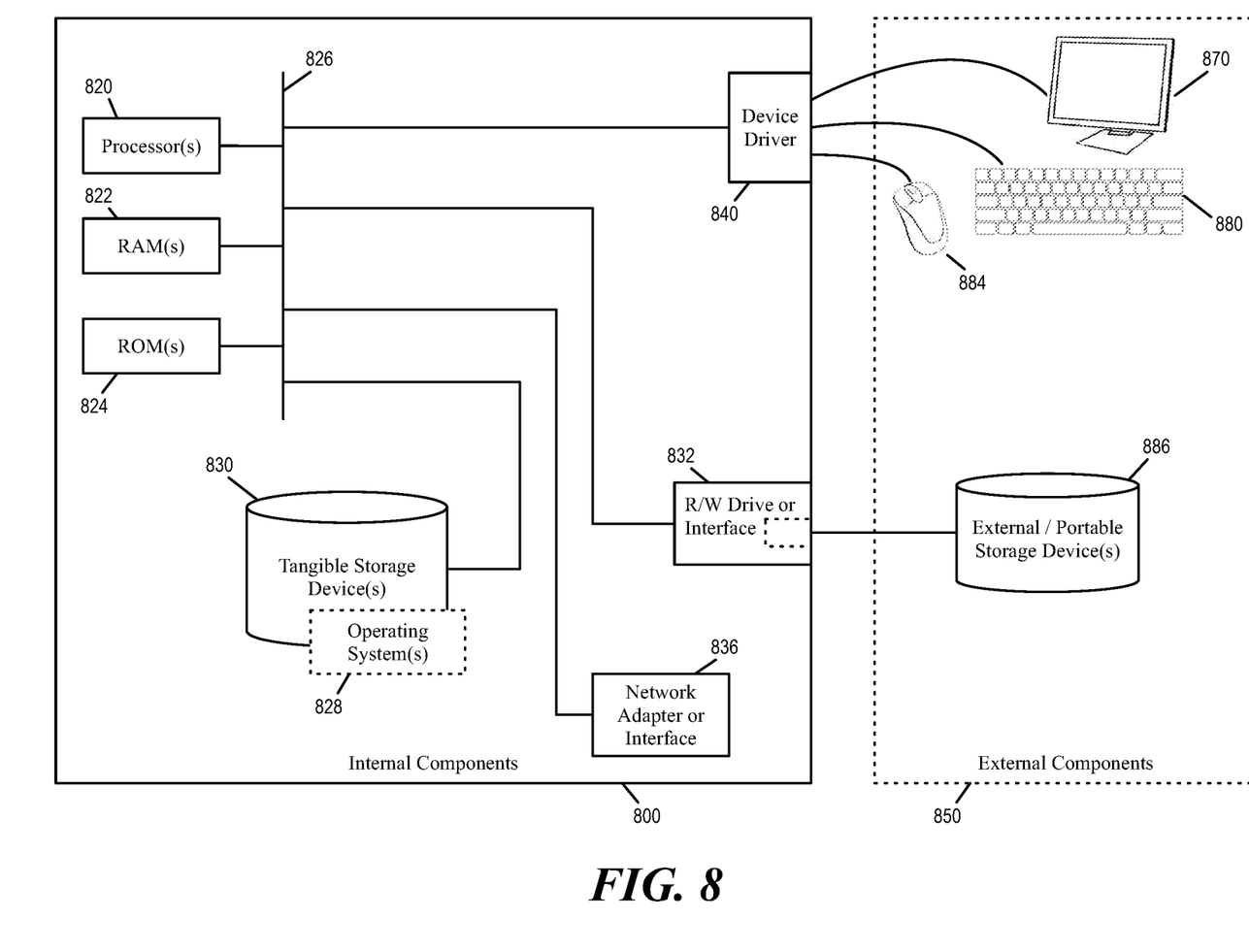
FIG. 8 shows a block diagram of the components of a data processing system in accordance with an illustrative embodiment of the present disclosure.

FIG. 8 shows a block diagram of the components of data processing systems 800 and 850 that may be used to implement a system for implicitly assessing a pupil's level of understanding of a learning content (i.e., the framework for derived assessment 100) in accordance with an illustrative embodiment of the present disclosure. It should be appreciated that FIG. 8 provides only an illustration of one implementation and does not imply any limitations with regard to the environments in which different embodiments may be implemented. Many modifications to the depicted environments may be made based on design and implementation requirements.

Data processing systems 800 and 850 are representative of any electronic device capable of executing machine-readable program instructions. Data processing systems 800 and 850 may be representative of a smart phone, a computer system, PDA, or other electronic devices. Examples of computing systems, environments, and/or configurations that may represented by data processing systems 800 and 850 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing systems 800 and 850 may include a set of internal components 800 and a set of external components 850 illustrated in FIG. 8. The set of internal components 800 includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs such as the programs for executing the process 700 are stored on one or more computer-readable tangible storage devices 830 for execution by one or more processors 820 via one or more RAMs 822 (which typically include cache memory). In the embodiment illustrated in FIG. 8, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

The set of internal components 800 also includes a R/W drive or interface 832 to read from and write to one or more portable computer-readable tangible storage devices 886 such as a CD-ROM, DVD, memory stick, magnetic tape, magnetic disk, optical disk or semiconductor storage device. The instructions for executing the process 700 can be stored on one or more of the respective portable computer-readable tangible storage devices 886, read via the respective R/W drive or interface 832 and loaded into the respective hard drive 830.

The set of internal components 800 may also include network adapters (or switch port cards) or interfaces 836 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 836. From the network adapters (or switch port adaptors) or interfaces 836, the instructions and data of the described programs or processes are loaded into the respective hard drive 830. The network may comprise copper wires, optical fibers, wireless transmission, routers, firewalls, switches, gateway computers and/or edge servers.

The set of external components 850 can include a computer display monitor 870, a keyboard 880, and a computer mouse 884. The set of external components 850 can also include touch screens, virtual keyboards, touch pads, pointing devices, and other human interface devices. The set of internal components 800 also includes device drivers 840 to interface to computer display monitor 870, keyboard 880 and computer mouse 884. The device drivers 840, R/W drive or interface 832 and network adapter or interface 836 comprise hardware and software (stored in storage device 830 and/or ROM 824).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving a learning content data having checkpoints embedded at different stages of the learning content data;
associating assessment instructions with each of the embedded checkpoints of the learning content data;
injecting the assessment instructions as code snippets into the learning content at the corresponding checkpoints for execution by a processor;
rendering, by execution of the code snippets at the processor, the received learning content data for presentation to a pupil and capturing a set of behaviors of the pupil using one or more sensors coupled to the processor during the presentation of the learning content data;
performing an assessment of the pupil, by the processor, at each of the embedded checkpoints encountered during the rendering of the learning presentation, wherein the assessment at an embedded checkpoint comprises the processor using the embedded checkpoint's associated assessment instructions to assign a score based on the set of behaviors captured by the one or more sensors coupled to the processor; and
producing an overall evaluation based on the assessment instructions at the encountered embedded checkpoints, wherein:
each embedded checkpoint is associated with a priority weight; and
producing the overall evaluation comprises weighting the assigned score of each embedded checkpoint according to the embedded checkpoint's associated priority weight.

2. The computer-implemented method of claim 1, wherein:
the learning content data embeds at least a first checkpoint and a second checkpoint; and
a priority weight associated with the first checkpoint is greater than a priority weight associated with the second checkpoint.

3. The computer-implemented method of claim 1, further comprising characterizing a captured behavior and assigning a confidence weight to the characterized behavior, wherein producing the overall evaluation comprises weighting the assigned score of an embedded checkpoint is based on the confidence weight of the characterized behaviors.

4. The computer-implemented method of claim 1, wherein using the embedded checkpoint's associated assessment instructions to assign a score based on the captured set of behaviors comprises using a threshold value that is normalized with respect to one or more characteristics of the pupil.

5. The computer-implemented method of claim 1, further comprising deriving the assessment instructions from statements written in a declarative language.

6. The computer-implemented method of claim 1, wherein the captured set of behaviors of the pupil comprise facial expressions, voices, gestures, eye-gazes, touches, and interactions with the presentation of the learning content data.

7. The computer-implemented method of claim 1, wherein:
the assessment instructions of an embedded checkpoint comprise rules for classifying the captured set of behaviors as numerical values; and
producing the overall evaluation comprises aggregating the numerical values of different embedded checkpoints into an overall evaluation value.

8. A computing device, comprising:

a processing unit;

a set of sensors coupled to the processing unit; and a storage device storing a set of instructions, wherein an execution of the set of instructions by the processing unit configures the computing device to perform acts, comprising:

receiving a learning content data having checkpoints embedded at different stages of the learning content data;

associating assessment instructions with each embedded checkpoint of the learning content data by the processing unit;

injecting the assessment instructions as code snippets into the learning content at the corresponding checkpoints for execution by the processing unit;

rendering, by execution of the code snippets by the processing unit, the received learning content for presentation to a pupil and capturing a set of behaviors of the pupil using the set of sensors during the presentation of the learning content data;

performing an assessment of the pupil, by the processing unit, at each embedded checkpoint encountered during the rendering of the learning presentation, wherein the assessment at an embedded checkpoint comprises using the embedded checkpoint's associated instructions to assign a score based on the set of behaviors captured by the set of sensors; and producing an overall evaluation based on the assessment instructions at the encountered embedded checkpoints, wherein:

each embedded checkpoint is associated with a priority weight; and producing the overall evaluation comprises weighting the assigned score of each embedded checkpoint according to the embedded checkpoint's associated priority weight.

9. The computing device of claim 8, wherein the set of instructions further configures the computing device to inject the assessment instructions into the learning content data for execution during the rendering of the learning content data.

10. The computing device of claim 8, wherein:

the learning content data embeds at least a first checkpoint and a second checkpoint; and a priority weight associated with the first checkpoint is greater than a priority weight associated with the second checkpoint.

11. The computing device of claim 8, wherein the set of instructions further configures the computing device to characterize a captured behavior and to assign a confidence weight to the characterized behavior, wherein producing the overall evaluation comprises weighting the assigned score of an embedded checkpoint is based on the confidence weight of the recognized behaviors.

12. The computing device of claim 8, wherein using the embedded checkpoint's associated assessment instructions to assign a score based on the captured set of behaviors comprises using a threshold value that is normalized with respect to one or more characteristics of the pupil.

13. The computing device of claim 8, wherein the captured set of behaviors of the pupil comprise facial expressions, voices, gestures, eye-gazes, touches, and interactions with the presentation of the learning content data.

14. The comprising device of claim 8, wherein:

the assessment instructions of an embedded checkpoint comprise rules for classifying captured set of behaviors as numerical values; and producing the overall evaluation comprises aggregating the numerical values of different embedded checkpoints into an overall value.

\* \* \* \* \*